United States Patent
Salsbury et al.

(10) Patent No.: US 11,137,160 B2
(45) Date of Patent: Oct. 5, 2021

(54) THERMOSTAT WITH ESTIMATION OF RUN-TIME SAVINGS

(71) Applicant: Johnson Controls Technology Company, Auburn Hills, MI (US)

(72) Inventors: Timothy I. Salsbury, Mequon, WI (US); John M. House, Montreal (CA)

(73) Assignee: Johnson Controls Tyco IP Holdings LLP, Milwaukee, WI (US)

( * ) Notice: Subject to any disclaimer, the term of this patent is extended or adjusted under 35 U.S.C. 154(b) by 0 days.

(21) Appl. No.: 16/531,892

(22) Filed: Aug. 5, 2019

(65) Prior Publication Data

US 2020/0041157 A1    Feb. 6, 2020

Related U.S. Application Data

(60) Provisional application No. 62/715,065, filed on Aug. 6, 2018.

(51) Int. Cl.
| | |
|---|---|
| *F24F 11/46* | (2018.01) |
| *F24F 11/523* | (2018.01) |
| *F24F 11/62* | (2018.01) |
| *F24F 11/65* | (2018.01) |
| *G05B 13/04* | (2006.01) |

(52) U.S. Cl.
CPC ............ *F24F 11/46* (2018.01); *F24F 11/523* (2018.01); *F24F 11/62* (2018.01); *F24F 11/65* (2018.01); *G05B 13/041* (2013.01); *G05B 2219/2642* (2013.01)

(58) Field of Classification Search
CPC .......... F24F 11/46; F24F 11/523; F24F 11/62; F24F 11/65; G05D 23/1904; G05D 23/1931; G05D 23/1917; G05B 13/041; G05B 2219/2642
See application file for complete search history.

(56) References Cited

U.S. PATENT DOCUMENTS

| | | | |
|---|---|---|---|
| 7,031,880 B1 | 4/2006 | Seem et al. | |
| 7,729,882 B2 | 6/2010 | Seem | |
| 8,255,085 B2 | 8/2012 | Salsbury | |
| 8,332,075 B2 | 12/2012 | Harrod et al. | |
| 8,755,943 B2 | 6/2014 | Wenzel | |
| 9,322,566 B2 | 4/2016 | Wenzel et al. | |
| 9,739,496 B2 | 8/2017 | Seem et al. | |
| 10,146,237 B2 | 12/2018 | Turney et al. | |
| 10,162,327 B2 | 12/2018 | Sinha et al. | |
| 10,295,214 B2 | 5/2019 | Bentz et al. | |

(Continued)

*Primary Examiner* — Christopher E. Everett

(74) *Attorney, Agent, or Firm* — Foley & Lardner LLP

(57) ABSTRACT

A space controller and method for determining energy savings of the space controller are provided. The method includes estimating, by one or more processing circuits, a steady state gain of a controlled variable of a heating, ventilation, and air conditioning (HVAC) system; determining, by the one or more processing circuits, an actual runtime that HVAC equipment of the HVAC system is in an on state based on a first setpoint or schedule; predicting, by the one or more processing circuits, a reduction of runtime that the HVAC equipment is in the on state for a second setpoint or schedule based on the actual runtime and the steady state gain; and adjusting, by the one or more processing circuits, the first setpoint or schedule to the second setpoint or schedule based on the reduction of runtime.

20 Claims, 6 Drawing Sheets

(56) References Cited

U.S. PATENT DOCUMENTS

| | | |
|---|---|---|
| 10,318,266 B2 | 6/2019 | Ribbich et al. |
| 2009/0171862 A1 | 7/2009 | Harrod et al. |
| 2013/0274928 A1* | 10/2013 | Matsuoka ............ G05B 19/042 |
| | | 700/276 |
| 2015/0267935 A1* | 9/2015 | Devenish ................ F24F 11/30 |
| | | 700/278 |
| 2016/0327298 A1 | 11/2016 | Sinha et al. |
| 2016/0327921 A1 | 11/2016 | Ribbich et al. |
| 2017/0076263 A1 | 3/2017 | Bentz et al. |
| 2017/0123391 A1 | 5/2017 | Sinha et al. |
| 2017/0234562 A1 | 8/2017 | Ribbich et al. |
| 2018/0031262 A1 | 2/2018 | Atchison et al. |
| 2018/0101158 A1 | 4/2018 | Guthrie et al. |
| 2018/0102954 A1 | 4/2018 | Schubert et al. |
| 2018/0102958 A1 | 4/2018 | Guthrie et al. |
| 2018/0163984 A1 | 6/2018 | Alberth, Jr. |
| 2018/0266718 A1 | 9/2018 | Gillette et al. |
| 2018/0267701 A1 | 9/2018 | Rigg et al. |
| 2018/0275625 A1 | 9/2018 | Park et al. |
| 2018/0299151 A1 | 10/2018 | Ajax et al. |
| 2018/0299158 A1 | 10/2018 | Ajax et al. |
| 2018/0299159 A1 | 10/2018 | Ajax et al. |
| 2018/0299161 A1 | 10/2018 | Ribbich et al. |
| 2018/0356111 A1 | 12/2018 | Salsbury et al. |
| 2019/0017719 A1 | 1/2019 | Sinha et al. |
| 2019/0145648 A1 | 5/2019 | Sinha et al. |
| 2019/0178518 A1 | 6/2019 | Zimmerman et al. |
| 2019/0178523 A1 | 6/2019 | Zimmerman et al. |

\* cited by examiner

THERMOSTAT WITH ESTIMATION OF RUN-TIME SAVINGS

CROSS-REFERENCE TO RELATED APPLICATION

This application claims priority to and the benefit of U.S. Provisional Application No. 62/715,065, filed Aug. 6, 2018, and entitled "Thermostat with Estimation of Run-Time Savings," the entire disclosure of which is incorporated by reference herein.

BACKGROUND

Generally, a thermostat is a component of a heating, ventilation, and air conditioning (HVAC) control system. A thermostat senses the temperature or other parameters (e.g., humidity) of an environment (e.g., a building, room, plant, or the like), and controls components of the HVAC system in order to maintain a set point for the temperature or other parameters. A thermostat may be designed to control a heating or cooling system (e.g., heating and cooling units) or an air conditioner. Thermostats use a variety of sensors to measure temperature and other desired parameters of a system.

SUMMARY

One implementation of the present disclosure is a method for determining energy savings of a space controller. The method includes estimating, by one or more processing circuits, a steady state gain of a controlled variable of a heating, ventilation, or air conditioning (HVAC) system; determining, by the one or more processing circuits, an actual runtime that HVAC equipment of the HVAC system is in an on state based on a first setpoint or schedule; predicting, by the one or more processing circuits, a reduction of runtime that the HVAC equipment is in the on state for a second setpoint or schedule based on the actual runtime and the steady state gain; and adjusting, by the one or more processing circuits, the first setpoint or schedule to the second setpoint or schedule based on the reduction of runtime.

In some embodiments, the controlled variable includes at least one of temperature, humidity, gas particulate level, flow rate, air quality, pressure, or combinations thereof.

In some embodiments, the first setpoint and the second setpoint include at least one of temperature setpoints, humidity setpoints, gas particulate level setpoints, flow rate setpoints, air quality setpoints, pressure setpoints, or derivatives thereof.

In some embodiments, the space controller includes at least one of a thermostat with an integrated user interface or a headless thermostat.

In some embodiments, the steady state gain of the controlled variable is estimated based on a balance point corresponding a state of a building at which gains of the controlled variable within the building are equal to losses of the controlled variable within the building.

In some embodiments, the steady state gain of the controlled variable is estimated based on a measured oscillation amplitude of the HVAC equipment, a time constant, an average on time of the HVAC equipment, and an average cycle time of the HVAC equipment.

In some embodiments, the steady state gain of the controlled variable is estimated based on an estimated oscillation amplitude of the HVAC equipment calculated at a sample time from a mean-squared error of the controlled variable compared to the first setpoint at the sample time, a cycle period calculated based on an average frequency of changes of an on/off state of the HVAC equipment over a sample period, and an on time calculated at the sample time based on the cycle period.

In some embodiments, the reduction of runtime corresponds to a difference between the actual runtime and an estimated runtime of the HVAC equipment for the second setpoint or schedule, the difference calculated based on the steady state gain of the controlled variable.

In some embodiments, adjusting of the first setpoint or schedule to the second setpoint or schedule includes displaying, by the one or more processors, an indicator corresponding to the reduction of runtime for the second setpoint or schedule on a display device associated with the space controller; receiving, by the one or more processors, a selection of the second setpoint or schedule; and adjusting, by the one or more processors, the first setpoint or schedule to the second setpoint or schedule in response to the selection.

In some embodiments, adjusting of the first setpoint or schedule to the second setpoint or schedule includes estimating, by the one or more processors, a reduction of energy consumption based on the reduction of runtime for the second setpoint or schedule; comparing, by the one or more processors, the reduction of energy consumption with a threshold value; and adjusting, by the one or more processors, the first setpoint or schedule to the second setpoint or schedule in response to the comparison.

Another implementation of the present disclosure is a space controller including a processor and non-transient memory. The memory include instructions that, when executed by the processor, cause the processor to estimate a steady state gain of a controlled variable of a heating, ventilation, or air conditioning (HVAC) system, determine an actual runtime that HVAC equipment of the HVAC system is in an on state based on a first setpoint or schedule, predict a reduction of runtime that the HVAC equipment is in the on state for a second setpoint or schedule based on the actual runtime and the steady state gain, and adjust the first setpoint or schedule to the second setpoint or schedule based on the reduction of runtime.

In some embodiments, the controlled variable includes at least one of temperature, humidity, gas particulate level, flow rate, air quality, pressure, or combinations thereof. In some embodiments, the first setpoint and the second setpoint comprise at least one of temperature setpoints, humidity setpoints, gas particulate level setpoints, flow rate setpoints, air quality setpoints, pressure setpoints, or derivatives thereof.

In some embodiments, the space controller includes at least one of a thermostat with an integrated user interface or a headless thermostat.

In some embodiments, the instructions further cause the processor to estimate the steady state gain of the controlled variable based on a balance point corresponding a state of a building at which gains of the controlled variable within the building are equal to losses of the controlled variable within the building.

In some embodiments, the instructions further cause the processor to determine the steady state gain of the controlled variable based on a measured oscillation amplitude of the HVAC equipment, a time constant, average on time of the HVAC equipment, and average cycle time of the HVAC equipment.

In some embodiments, the instructions further cause the processor to determine the steady state gain of the controlled variable based on an estimated oscillation amplitude of the HVAC equipment calculated at a sample time from a mean-squared error of the controlled variable compared to the first setpoint at the sample time, a cycle period calculated based on an average frequency of changes of an on/off state of the HVAC equipment over a sample period, and an on time calculated at the sample time based on the cycle period.

In some embodiments, the reduction of runtime corresponds to a difference between the actual runtime and an estimated runtime of the HVAC equipment for the second setpoint or schedule, the difference calculated based on the steady state gain of the controlled variable.

In some embodiments, to adjust the first setpoint or schedule to the second setpoint or schedule, the instructions further cause the processor to display an indicator corresponding to the reduction of runtime for the second setpoint or schedule on a display device associated with the space controller, receive a selection of the second setpoint or schedule, and adjust the first setpoint or schedule to the second setpoint or schedule in response to the selection.

In some embodiments, to adjust the first setpoint or schedule to the second setpoint or schedule, the instructions further cause the processor to estimate a reduction of energy consumption based on the reduction of runtime for the second setpoint or schedule, compare the reduction of energy consumption with a threshold value, and adjust the first setpoint or schedule to the second setpoint or schedule in response to the comparison.

Another implementation of the present disclosure is a system including one or more computing devices comprising one or more processors and non-transient memory. The memory store instructions that, when executed by the one or more processors, cause the one or more processors to estimate a steady state gain of a controlled variable of a heating, ventilation, or air conditioning (HVAC) system; determine an actual runtime that HVAC equipment of the HVAC system is in an on state based on a first setpoint or schedule; predict a reduction of runtime that the HVAC equipment is in the on state for a second setpoint or schedule based on the actual runtime and the steady state gain; and adjust the first setpoint or schedule to the second setpoint or schedule based on the reduction of runtime.

In some embodiments, the plurality of computing devices include a space controller and a remote device. The space controller may be configured to determine the actual runtime that the HVAC equipment is in the on state based on the first setpoint or schedule and adjust the first setpoint or schedule to the second setpoint or schedule based on the reduction of runtime. The remote device may be communicably coupled to the space controller and configured to estimate the steady state gain of the controlled variable of the HVAC system and predict the reduction of runtime that the HVAC equipment is in the on state for the second setpoint or schedule based on the actual runtime and the steady state gain.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

DETAILED DESCRIPTION

Overview

Referring generally to the FIGURES, a thermostat (or other suitable space controller) for estimating runtime savings of heating, ventilation, and air conditioning (HVAC) equipment (or heating and cooling units) under one or more different setpoints or schedules (e.g., temperature setpoints, humidity setpoints, gas particulates setpoints, pressure setpoints, flow rate setpoints, and/or the like) than the one actually used (or set) is shown, according to various exemplary embodiments. The estimated runtime savings described herein can be used to determine various setpoints or schedules (e.g., temperature setpoints, humidity setpoints, gas particulates setpoints, pressure setpoints, flow rate setpoints, and/or the like) that can be used to reduce or minimize energy usage by the HVAC equipment under conditions that are unique to the building or space (e.g., environment, plant, or the like). In some embodiments, the estimated runtime savings for various different setpoints or schedules are presented to the user on a user interface of the thermostat, and the user can change the setpoint or schedule based on the estimated runtime savings. In some embodiments, an alternative setpoint or schedule than the one actually used (or set) may be automatically set by the thermostat to provide a desired or predetermined amount of energy savings. In various embodiments, the estimated runtime savings is calculated by the thermostat based on a simple and model free solution with low or minimal data storage requirements and low computational burden.

While a thermostat is provided in the figures as an example device to implement one or more aspects and features of the present disclosure, the present disclosure is not limited thereto. For example, in various embodiments, any suitable space controller that controls a condition or controlled variable (e.g., temperature, humidity, gas particulates, pressure, flow rate, and/or the like or any suitable combinations thereof) in a space, plant, room, building, environment and/or the like may be implemented with one or more aspects and features of the present disclosure to estimate the runtime savings of corresponding equipment and devices (e.g., HVAC equipment) based on any suitable setpoint or schedule (e.g., temperature setpoint, humidity setpoint, gas particulates setpoint, pressure setpoint, flow rate setpoint, and/or the like).

Thermostat and HVAC System

Figure 1A:
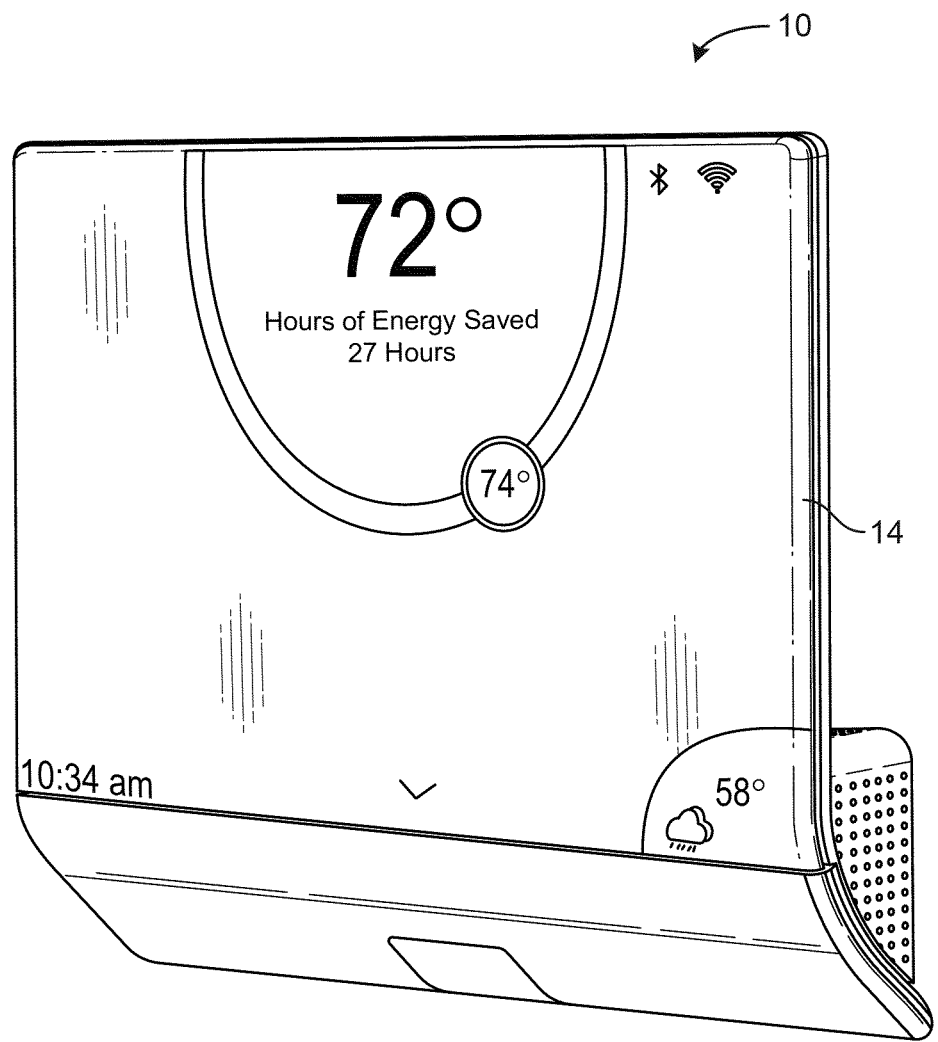
FIG. 1A is a drawing of a thermostat with a transparent cantilevered display, according to an exemplary embodiment.

FIG. 1A is a drawing of a thermostat 10 that includes a transparent cantilevered user interface 14. Hereinafter, an example of the space controller is described as a thermostat (e.g., the thermostat 10 of FIG. 1A) for convenience, but the present disclosures is not limited thereto, and it should be appreciated that the space controller may include any suitable controller device, for example, such as a thermostat, a humidity controller, gas particulate controller, air flow controller, pressure controller, or any other suitable controller device. A suitable thermostat may include a user interface (e.g., a display screen, buttons, a touch-sensitive display, etc.) or may be a headless thermostat without a user interface.

As shown in FIG. 1A, when the space controller includes the thermostat 10 having the user interface 14 (i.e., a non-headless thermostat), the user interface 14 may be an interactive display that can display information to a user and receive input from the user. The user interface 14 may be transparent such that a user can view information on the display and view a surface (e.g., a wall) located behind the display. In various embodiments, the thermostat 10 can be configured to estimate run-time saving of the HVAC equipment (e.g., heating and cooling units) of a home or building of the user under one or more different setpoints or schedules (e.g., temperature setpoints or schedules) than the setpoint or schedule currently used. In some embodiments, the thermostat 10 is configured to provide an optimal setpoint or schedule (e.g., temperature setpoint or schedule) to the user via the user interface 14 on the thermostat 10 in order to reduce the runtime of the HVAC equipment, thereby reducing energy usage. In some embodiments, the thermostat 10 is configured to automatically adjust the setpoint or schedule (e.g., temperature setpoint or schedule) based on the optimal setpoint or schedule (e.g., the optimal temperature set-point or schedule). Thermostats with transparent and cantilevered user interfaces are described in further detail in U.S. patent application Ser. No. 15/146,649 filed May 4, 2016, the entirety of which is incorporated by reference herein.

The user interface 14 can be a touchscreen or other type of electronic display configured to present information to a user in a visual format (e.g., as text, graphics, etc.) and receive input from a user (e.g., via a touch-sensitive panel). For example, the user interface 14 may include a touch-sensitive panel layered on top of an electronic visual display. A user can provide inputs through simple or multi-touch gestures by touching the user interface 14 with one or more fingers and/or with a stylus or pen. The user interface 14 can use any of a variety of touch-sensing technologies to receive user inputs, such as capacitive sensing (e.g., surface capacitance, projected capacitance, mutual capacitance, self-capacitance, etc.), resistive sensing, surface acoustic wave, infrared grid, infrared acrylic projection, optical imaging, dispersive signal technology, acoustic pulse recognition, or other touch-sensitive technologies known in the art. Many of these technologies allow for multi-touch responsiveness of user interface 14 allowing registration of touch in two or even more locations at once. The display may use any of a variety of display technologies such as light emitting diode (LED), organic light-emitting diode (OLED), liquid-crystal display (LCD), organic light-emitting transistor (OLET), surface-conduction electron-emitter display (SED), field emission display (FED), digital light processing (DLP), liquid crystal on silicon (LCoS), or any other display technologies known in the art. In some embodiments, the user interface 14 is configured to present visual media (e.g., text, graphics, etc.) without requiring a backlight.

Figure 1B:
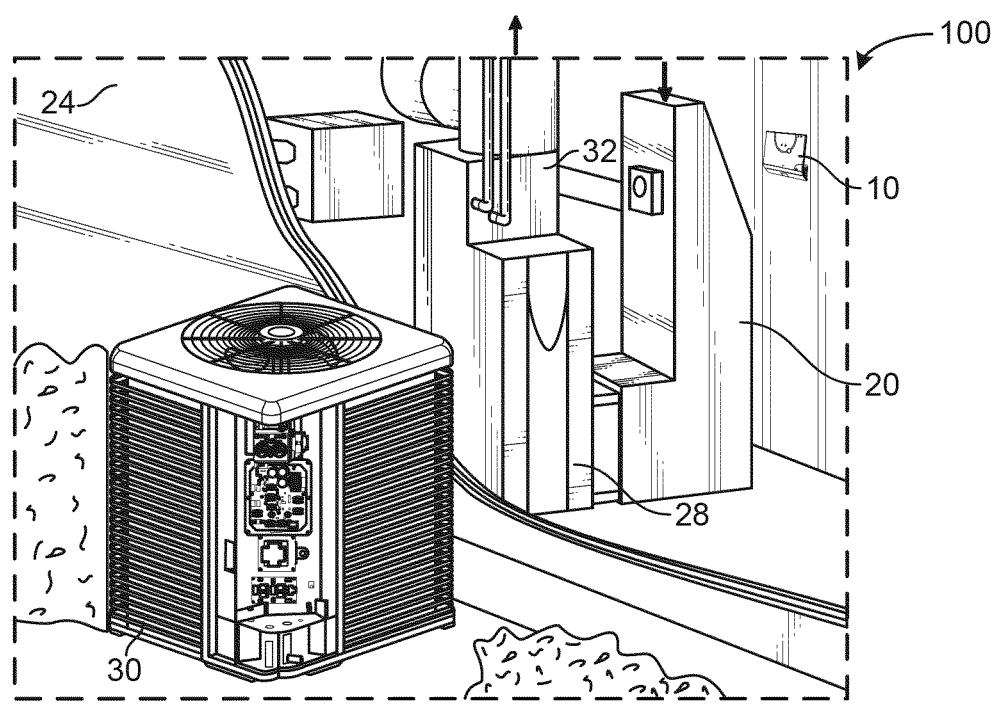
FIG. 1B is a schematic drawing of a building equipped with a residential heating and cooling system and a thermostat, according to an exemplary embodiment.

FIG. 1B illustrates a residential heating and cooling system 100, such as an HVAC system. The residential heating and cooling system 100 may provide heated and cooled air to a residential structure. Although described as a residential heating and cooling system 100, embodiments of the systems and methods described herein can be utilized in a cooling unit or a heating unit of a variety of applications including commercial HVAC units (e.g., roof top units). In general, a residence 24 includes refrigerant conduits that operatively couple an indoor unit 28 to an outdoor unit 30. Indoor unit 28 may be positioned in a utility space, an attic, a basement, and so forth. Outdoor unit 30 is situated adjacent to a side of residence 24. Refrigerant conduits transfer refrigerant between indoor unit 28 and outdoor unit 30, typically transferring primarily liquid refrigerant in one direction and primarily vaporized refrigerant in an opposite direction.

When the system 100 shown in FIG. 1B is operating as an air conditioner, a coil in outdoor unit 30 serves as a condenser for recondensing vaporized refrigerant flowing from indoor unit 28 to outdoor unit 30 via one of the refrigerant conduits. In these applications, a coil of the indoor unit 28 (i.e., indoor coil 32) serves as an evaporator coil. Indoor coil 32 receives liquid refrigerant (which may be expanded by an expansion device, not shown) and evaporates the refrigerant before returning it to outdoor unit 30.

Outdoor unit 30 draws in environmental air through its sides as indicated by the arrows directed to the sides of the unit, forces the air through the outdoor unit coil using a fan, and expels the air. When operating as an air conditioner, the air is heated by the condenser coil within the outdoor unit 30 and exits the top of the unit at a temperature higher than it entered the sides. Air is blown over indoor coil 32 and is then circulated through residence 24 by means of ductwork 20, as indicated by the arrows entering and exiting ductwork 20. The overall system 100 operates to maintain a desired temperature as set by thermostat 10. When the temperature sensed inside the residence 24 is higher than the set point on the thermostat 10 (with the addition of a relatively small tolerance), the air conditioner will become operative to cool additional air for circulation through the residence 24. When the temperature reaches the set point (with the removal of a relatively small tolerance), the unit can stop the cooling cycle temporarily.

In some embodiments, the system 100 is configured so that the outdoor unit 30 is controlled to achieve a more elegant control over temperature and humidity within the residence 24. The outdoor unit 30 is controlled to operate components within the outdoor unit 30, and the system 100, based on a percentage of a delta between a minimum operating value of the compressor and a maximum operating value of the compressor plus the minimum operating value. In some embodiments, the minimum operating value and the maximum operating value are based on the determined outdoor ambient temperature, and the percentage of the delta is based on a predefined temperature differential multiplier and one or more time dependent multipliers.

Figure 2:
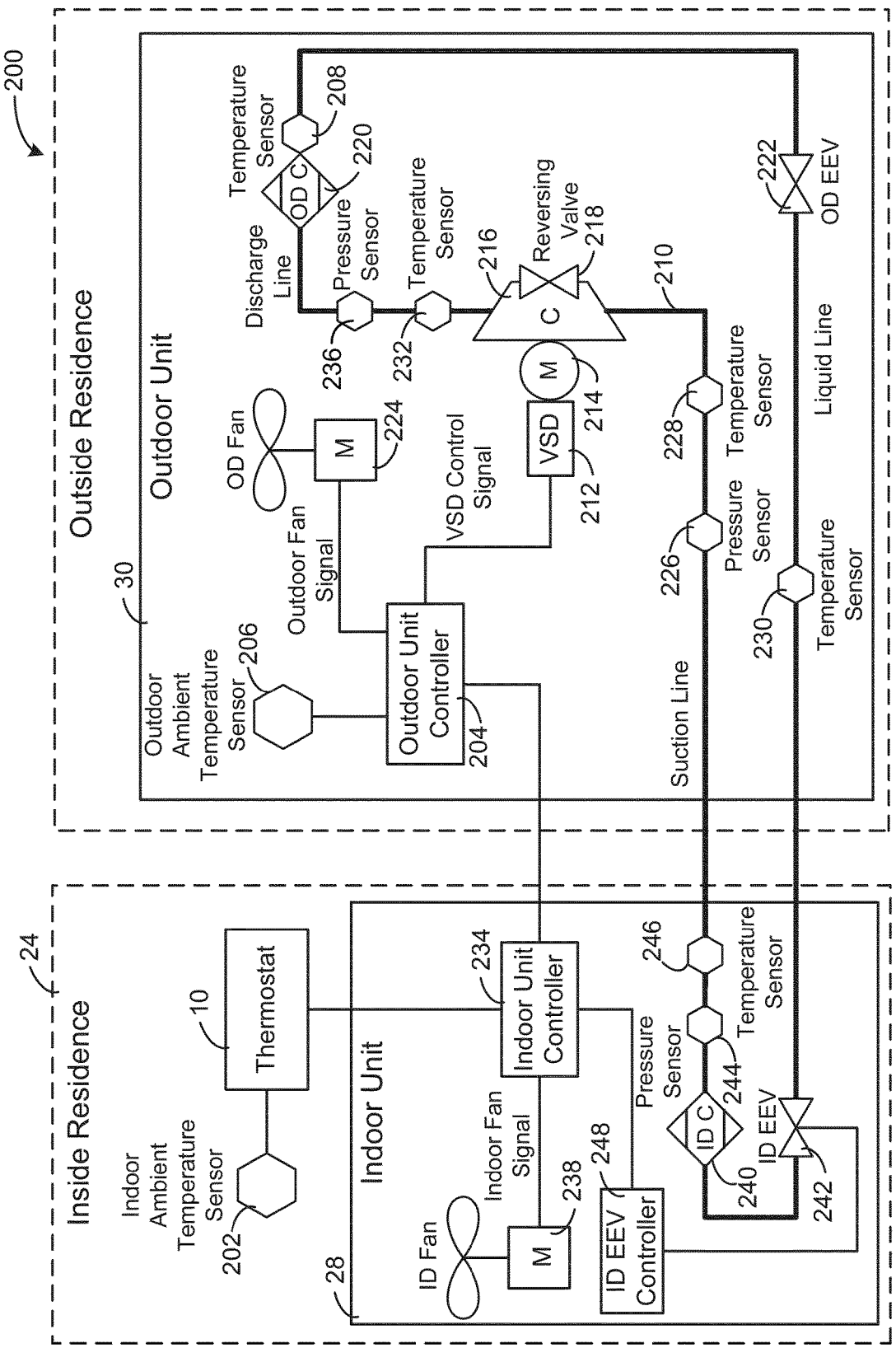
FIG. 2 is a schematic drawing of the thermostat and the residential heating and cooling system of FIG. 1, according to an exemplary embodiment.

Referring now to FIG. 2, an HVAC system 200 is shown according to an exemplary embodiment. Various components of system 200 are located inside residence 24 while other components are located outside residence 24. Outdoor unit 30, as described with reference to FIG. 1, is shown to be located outside residence 24 while indoor unit 28 and thermostat 10, as described with reference to FIG. 1, are shown to be located inside the residence 24. In various embodiments, the thermostat 10 can cause the indoor unit 28 and the outdoor unit 30 to heat residence 24. In some embodiments, the thermostat 10 can cause the indoor unit 28 and the outdoor unit 30 to cool the residence 24. In other embodiments, the thermostat 10 can command an airflow change within the residence 24 to adjust the humidity within the residence 24.

Thermostat 10 can be configured to generate control signals for indoor unit 28 and/or outdoor unit 30. The thermostat 10 is shown to be connected to an indoor ambient temperature sensor 202, and an outdoor unit controller 204 is shown to be connected to an outdoor ambient temperature sensor 206. The indoor ambient temperature sensor 202 and the outdoor ambient temperature sensor 206 may be any kind of temperature sensor (e.g., thermistor, thermocouple, etc.). The thermostat 10 may measure the temperature of residence 24 via the indoor ambient temperature sensor 202. Further, the thermostat 10 can be configured to receive the temperature outside residence 24 via communication with the outdoor unit controller 204. In various embodiments, the thermostat 10 generates control signals for the indoor unit 28 and the outdoor unit 30 based on the indoor ambient temperature (e.g., measured via indoor ambient temperature sensor 202), the outdoor temperature (e.g., measured via the outdoor ambient temperature sensor 206), and/or a temperature set point.

The indoor unit 28 and the outdoor unit 30 may be electrically connected. Further, indoor unit 28 and outdoor unit 30 may be coupled via conduits 210. The outdoor unit 30 can be configured to compress refrigerant inside conduits 210 to either heat or cool the building based on the operating mode of the indoor unit 28 and the outdoor unit 30 (e.g., heat pump operation or air conditioning operation). The refrigerant inside conduits 210 may be any fluid that absorbs and extracts heat. For example, the refrigerant may be hydrofluorocarbon (HFC) based R-410A, R-407C, and/or R-134a.

The outdoor unit 30 is shown to include the outdoor unit controller 204, a variable speed drive 212, a motor 214 and a compressor 216. The outdoor unit 30 can be configured to control the compressor 216 and to further cause the compressor 216 to compress the refrigerant inside conduits 210. In this regard, the compressor 216 may be driven by the variable speed drive 212 and the motor 214. For example, the outdoor unit controller 204 can generate control signals for the variable speed drive 212. The variable speed drive 212 (e.g., an inverter, a variable frequency drive, etc.) may be an AC-AC inverter, a DC-AC inverter, and/or any other type of inverter. The variable speed drive 212 can be configured to vary the torque and/or speed of the motor 214 which in turn drives the speed and/or torque of compressor 216. The compressor 216 may be any suitable compressor such as a screw compressor, a reciprocating compressor, a rotary compressor, a swing link compressor, a scroll compressor, or a turbine compressor, etc.

In some embodiments, the outdoor unit controller 204 is configured to process data received from the thermostat 10 to determine operating values for components of the system 100, such as the compressor 216. In one embodiment, the outdoor unit controller 204 is configured to provide the determined operating values for the compressor 216 to the variable speed drive 212, which controls a speed of the compressor 216. The outdoor unit controller 204 is controlled to operate components within the outdoor unit 30, and the indoor unit 28, based on a percentage of a delta between a minimum operating value of the compressor and a maximum operating value of the compressor plus the minimum operating value. In some embodiments, the minimum operating value and the maximum operating value are based on the determined outdoor ambient temperature, and the percentage of the delta is based on a predefined temperature differential multiplier and one or more time dependent multipliers.

In some embodiments, the outdoor unit controller 204 can control a reversing valve 218 to operate system 200 as a heat pump or an air conditioner. For example, the outdoor unit controller 204 may cause reversing valve 218 to direct compressed refrigerant to the indoor coil 32 (240 in FIG. 2) while in heat pump mode and to an outdoor coil 220 while in air conditioner mode. In this regard, the indoor coil 32 and the outdoor coil 220 can both act as condensers and evaporators depending on the operating mode (i.e., heat pump or air conditioner) of system 200.

Further, in various embodiments, outdoor unit controller 204 can be configured to control and/or receive data from an outdoor electronic expansion valve (EEV) 222. The outdoor electronic expansion valve 222 may be an expansion valve controlled by a stepper motor. In this regard, the outdoor unit controller 204 can be configured to generate a step signal (e.g., a PWM signal) for the outdoor electronic expansion valve 222. Based on the step signal, the outdoor electronic expansion valve 222 can be held fully open, fully closed, partial open, etc. In various embodiments, the outdoor unit controller 204 can be configured to generate step signal for the outdoor electronic expansion valve 222 based on a subcool and/or superheat value calculated from various temperatures and pressures measured in system 200. In one embodiment, the outdoor unit controller 204 is configured to control the position of the outdoor electronic expansion valve 222 based on a percentage of a delta between a minimum operating value of the compressor and a maximum operating value of the compressor plus the minimum operating value. In some embodiments, the minimum operating value and the maximum operating value are based on the determined outdoor ambient temperature, and the percentage of the delta is based on a predefined temperature differential multiplier and one or more time dependent multipliers.

The outdoor unit controller 204 can be configured to control and/or power outdoor fan 224. The outdoor fan 224 can be configured to blow air over the outdoor coil 220. In this regard, the outdoor unit controller 204 can control the amount of air flowing over the outdoor coil 220 by generating control signals to control the speed and/or torque of outdoor fan 224. In some embodiments, the control signals are pulse wave modulated signals (PWM), analog voltage signals (i.e., varying the amplitude of a DC or AC signal), and/or any other type of signal. In one embodiment, the outdoor unit controller 204 can control an operating value of the outdoor fan 224, such as speed, based on a percentage of a delta between a minimum operating value of the compressor and a maximum operating value of the compressor plus the minimum operating value. In some embodiments, the minimum operating value and the maximum operating value are based on the determined outdoor ambient temperature, and the percentage of the delta is based on a predefined temperature differential multiplier and one or more time dependent multipliers.

The outdoor unit 30 may include one or more temperature sensors and one or more pressure sensors. The temperature sensors and pressure sensors may be electrical connected (i.e., via wires, via wireless communication, etc.) to the outdoor unit controller 204. In this regard, the outdoor unit controller 204 can be configured to measure and store the temperatures and pressures of the refrigerant at various locations of the conduits 210. The pressure sensors may be any kind of transducer that can be configured to sense the pressure of the refrigerant in the conduits 210. The outdoor unit 30 is shown to include pressure sensor 226. The pressure sensor 226 may measure the pressure of the refrigerant in conduit 210 in the suction line (i.e., a predefined distance from the inlet of compressor 216). Further, the outdoor unit 30 is shown to include pressure sensor 236. The pressure sensor 236 may be configured to measure the pressure of the refrigerant in conduits 210 on the discharge line (e.g., a predefined distance from the outlet of compressor 216).

The temperature sensors of outdoor unit 30 may include thermistors, thermocouples, and/or any other temperature sensing device. The outdoor unit 30 is shown to include temperature sensor 208, temperature sensor 228, temperature sensor 230, and temperature sensor 232. The temperature sensors (i.e., temperature sensor 208, temperature sensor 228, temperature sensor 230, and/or temperature sensor 232) can be configured to measure the temperature of the refrigerant at various locations inside conduits 210.

Referring now to the indoor unit 28, the indoor unit 28 is shown to include indoor unit controller 234, indoor electronic expansion valve controller 248, an indoor fan 238, an indoor coil 240, an indoor electronic expansion valve 242, a pressure sensor 244, and a temperature sensor 246. The indoor unit controller 234 can be configured to generate control signals for indoor electronic expansion valve controller 248. The signals may be set points (e.g., temperature set point, pressure set point, superheat set point, subcool set point, step value set point, etc.). In this regard, indoor electronic expansion valve controller 248 can be configured to generate control signals for indoor electronic expansion valve 242. In various embodiments, indoor electronic expansion valve 242 may be the same type of valve as outdoor electronic expansion valve 222. In this regard, indoor electronic expansion valve controller 248 can be configured to generate a step control signal (e.g., a PWM wave) for controlling the stepper motor of the indoor electronic expansion valve 242. In this regard, indoor electronic expansion valve controller 248 can be configured to fully open, fully close, or partially close the indoor electronic expansion valve 242 based on the step signal.

Indoor unit controller 234 can be configured to control indoor fan 238. The indoor fan 238 can be configured to blow air over indoor coil 240. In this regard, the indoor unit controller 234 can control the amount of air blowing over the indoor coil 240 by generating control signals to control the speed and/or torque of the indoor fan 238. In some embodiments, the control signals are pulse wave modulated signals (PWM), analog voltage signals (i.e., varying the amplitude of a DC or AC signal), and/or any other type of signal. In one embodiment, the indoor unit controller 234 may receive a signal from the outdoor unit controller indicating one or more operating values, such as speed for the indoor fan 238. In one embodiment, the operating value associated with the indoor fan 238 is an airflow, such as cubic feet per minute (CFM). In one embodiment, the outdoor unit controller 204 may determine the operating value of the indoor fan based on a percentage of a delta between a minimum operating value of the compressor and a maximum operating value of the compressor plus the minimum operating value. In some embodiments, the minimum operating value and the maximum operating value are based on the determined outdoor ambient temperature, and the percentage of the delta is based on a predefined temperature differential multiplier and one or more time dependent multipliers.

The indoor unit controller 234 may be electrically connected (e.g., wired connection, wireless connection, etc.) to pressure sensor 244 and/or temperature sensor 246. In this regard, the indoor unit controller 234 can take pressure and/or temperature sensing measurements via pressure sensor 244 and/or temperature sensor 246. In one embodiment, pressure sensor 244 and temperature sensor 246 are located on the suction line (i.e., a predefined distance from indoor coil 240). In other embodiments, the pressure sensor 244 and/or the temperature sensor 246 may be located on the liquid line (i.e., a predefined distance from indoor coil 240).

Figure 3A:
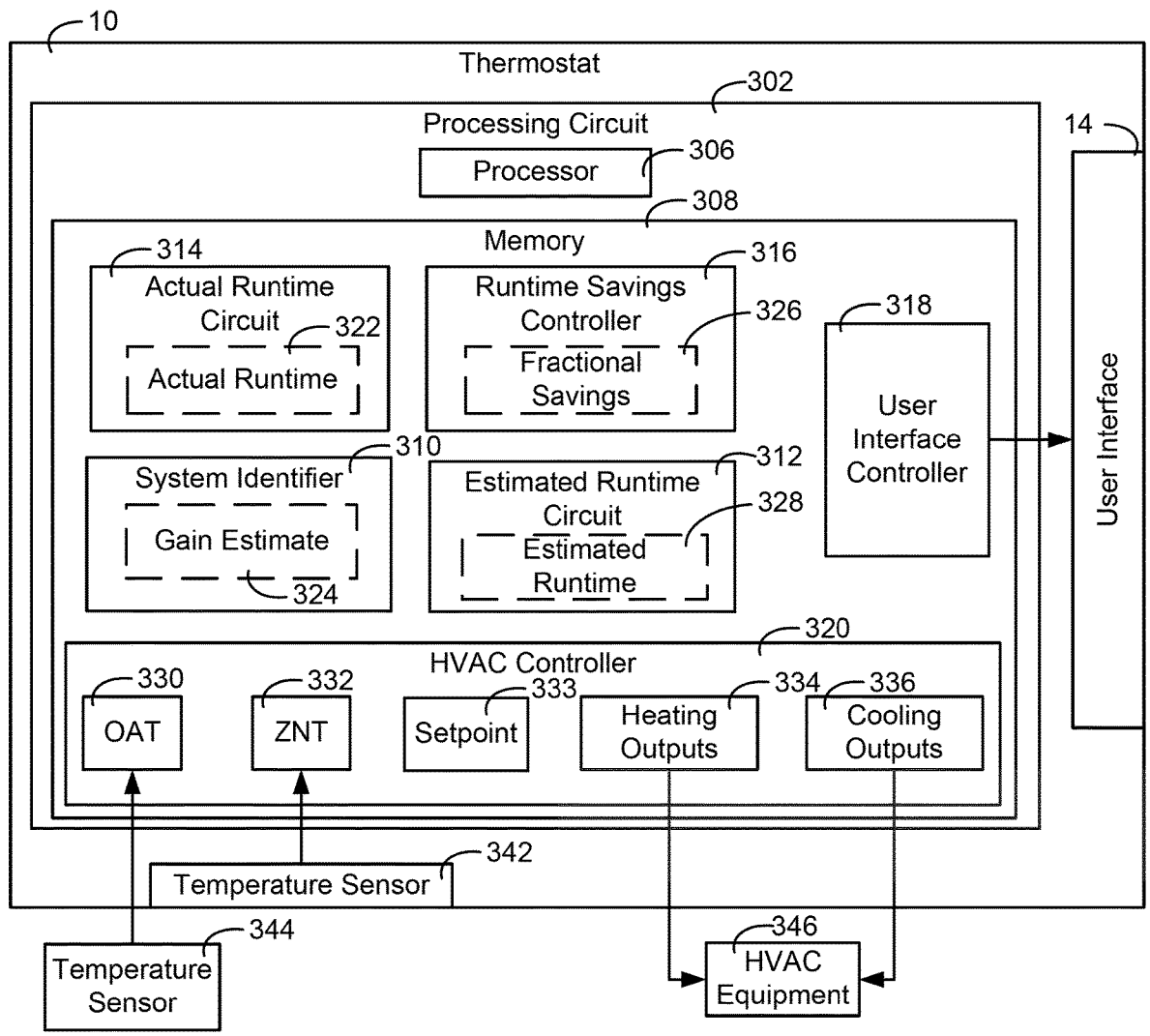
FIG. 3A is a block diagram of the thermostat of FIGS. 1A, 1B, and 2 shown in greater detail, according to an exemplary embodiment.

Referring now to FIG. 3A, the thermostat 10 as described with reference to FIGS. 1A-2 is shown in greater detail, according to an exemplary embodiment. The thermostat 10 is shown to communicate to temperature sensors 342 and 344 and HVAC equipment 346. The thermostat 10 is further shown to include the user interface 14.

The user interface 14 may be a touch screen display configured to receive input from a user and display images and text to a user. In some embodiments, user interface 14 is at least one or a combination of a resistive touch screen and a capacitive touch screen (e.g., projective capacitive touch screen). In some embodiments, the user interface 14 is a transparent touch screen device. In some embodiments, the user interface 14 is a laser display, a holographic display, a light field display, and/or any other display or combination of displays. The user interface 14 may be configured to display images and text to a user but may not be configured to receive input from the user. In some embodiments, the user interface 14 is one or a combination of a CRT display, an LCD display, an LED display, a plasma display, and/or an OLED display (e.g., a transparent OLED display).

The temperature sensors 342 and 344 can be configured to measure the ambient temperature of a building (e.g. the residence 24), the temperature of a zone associated with the building, and/or an outdoor temperature. Temperature sensors 342 and 344 may be sensors outputting an analog signal (e.g., sinusoid, square wave, PWM wave, etc.) and/or a measureable value (e.g. current, voltage, resistance) and/or may be a temperature module outputting a digital value. The temperature sensors 342 and 344 may communicate a digital and/or analog value to the thermostat 10. The temperature sensors 342 and/or 344 may be located inside an enclosure of the thermostat 10, outside the thermostat 10, outside a building, and/or inside a building. The temperature sensors 342 and 344 may be any other type or combination of temperature sensor. In some embodiments, temperature sensor 344 is an outdoor temperature sensor owned by a third party (e.g., a weather forecaster, or a weather service). The thermostat 10 may receive (e.g., receive via a network) the temperature from the third party which identifies the outdoor temperature.

The temperature sensors 342 and 344 may be part of thermostat 10 (e.g., located in the same enclosure as thermostat 10), or may be one or more external sensors. The thermostat 10 can receive, determine, and/or store measured temperature values of temperature sensors 342 and 344. The temperature measured by the temperature sensor 342 may be stored as zone or indoor temperature (ZNT) 332. The temperature measured by the temperature sensors 344 may be stored as an outdoor air temperature (OAT) 330.

The processing circuit 302 is shown to include a processor 306 and a memory 308. The processor 306 can be a general purpose or specific purpose processor, an application specific integrated circuit (ASIC), one or more field programmable gate arrays (FPGAs), a group of processing components, or other suitable processing components. The processor 306 may be configured to execute computer code and/or instructions stored in the memory 308 or received from other computer readable media (e.g., CDROM, network storage, a remote server, etc.).

The memory 308 can include one or more devices (e.g., memory units, memory devices, storage devices, etc.) for storing data and/or computer code for completing and/or facilitating the various processes described in the present disclosure. The memory 308 can include random access memory (RAM), read-only memory (ROM), hard drive storage, temporary storage, non-volatile memory, flash memory, optical memory, or any other suitable memory for storing software objects and/or computer instructions. The memory 308 can include database components, object code components, script components, or any other type of information structure for supporting the various activities and information structures described in the present disclosure. The memory 308 can be communicably connected to the processor 306 via the processing circuit 302 and can include computer code for executing (e.g., by the processor 306) one or more processes described herein.

In some embodiments, the memory 308 includes an HVAC controller 320. The HVAC controller 320 can be configured to control the HVAC equipment 346. The HVAC equipment 346 can be the indoor unit 28 and/or the outdoor unit 30 as well as any industrial airside or waterside system or other HVAC equipment. Examples of such industrial systems are described in more detail in U.S. patent application Ser. No. 15/338,215, filed on Oct. 28, 2016, the entire disclosure of which is incorporated by reference herein.

In some embodiments, the HVAC controller 320 controls the HVAC equipment 346 based on a temperature setpoint 333. In some embodiments, the HVAC controller 320 may use any of a variety of control algorithms (e.g., state-based algorithms, extremum-seeking control algorithms, PID control algorithms, model predictive control algorithms, feedback control algorithms, etc.) to determine appropriate control actions for any of the HVAC equipment 346 connected to the thermostat 10 as a function of temperature and/or humidity.

The HVAC controller 320 is shown to store values for the OAT 330 and the ZNT 332. Further, the HVAC controller 320 is shown to store and/or determine, heating outputs 334 and cooling outputs 336 based on the temperature setpoint 333. The heating outputs 334 may be commands to turn on one or more heating states of the HVAC equipment 346. For example, the heating outputs 334 may be a single on/off stage heating or may be first and second stage heating (e.g., W1 and W2). Similarly, the cooling outputs 336 can be determined and/or stored by the HVAC controller 320 for one or more cooling stages of the HVAC equipment 346. For example, the cooling stages may a single on/off stage cooling or may be first and second stage cooling (e.g., Y1 and Y2). Various other outputs can be determined and stored by the HVAC controller 320, for example, a fan output (e.g., G), an auxiliary output (e.g., AUX), and/or any other suitable output.

Based on the outputs for the HVAC equipment 346, the HVAC controller 320 may include one or more output circuits of the thermostat 10. The output circuits may be solid state switches, relays, triacs, FET switches, BJT switches, etc. Based on which heating or cooling stage that the HVAC controller 320 determines to turn on or off to meet the setpoint 333 (e.g., the heating outputs 334 and/or the cooling outputs 336), the output circuits can be configured to cause the HVAC equipment 346 to be operated per the outputs (e.g., the heating outputs 334 and the cooling outputs 336) determined by the HVAC controller 320.

In some embodiments, the memory 308 includes an actual runtime circuit 314. The actual runtime circuit 314 is configured to calculate and store an actual runtime 322. The actual runtime 322 may be one or more lengths of time that the HVAC controller 320 operates the HVAC equipment 346 (e.g. in the on state). For example, for a single state on/off heating and cooling system, in order to achieve an average temperature setpoint ($T_{sp}$) that is between a steady-state temperature when the equipment is in the on state ($T_{r,on}$) and a steady state temperature when the equipment is in the off state ($T_{r,off}$), where $T_{r,on} > T_{r,off}$ for heating and $T_{r,on} < T_{r,off}$ for cooling, the heating and/or cooling cycles on and off so that a fraction (or percentage) of time spent in the on state ($f_{on,sp}$) is defined by equation 1:

$$f_{on,sp} = \frac{T_{sp} - T_{r,off}}{T_{r,on} - T_{r,off}} \quad (1)$$

In this case, for a single state on/off heating and cooling system, the control logic, which is usually a deadband around a temperature setpoint, causes the equipment to cycle on and off at a frequency determined by several factors, such as the size (or length) of the deadband and the dynamic and static characteristics of the room and plant. Thus, given this periodic behavior, the room temperature can be regulated to a given setpoint by satisfying equation 1, since the dynamics of the system and plant act as an averaging element for the on/off signal. Accordingly, the average value of the output is directly proportional to the average value of the input, and the average value of the input is the fraction (or percentage) of time spent in the on state ($f_{on,sp}$). Thus, the actual runtime circuit 314 calculates the actual runtime ($f_{on,act}$) 322 using equation 2:

$$f_{on,act} = \frac{\overline{T_r} - T_{r,off}}{K} \quad (2)$$

where $T_r$ is the average room temperature over a period under consideration (e.g., a year, month, week, day, hour, and/or minute), and K is considered to be a steady state gain of a controlled variable (e.g., temperature) of the HVAC system (e.g., the denominator in equation 1; $K=T_{r,on}-T_{r,off}$). Thus, in one example, the steady state gain K is a temperature gain dependent on the operating conditions of the HVAC equipment and characteristics of the space (e.g., room, building, plant, or the like) that is served by the HVAC equipment, but the present disclosure is not limited thereto, and in various embodiments, the steady state gain K may be a steady state gain of any suitable control variable (e.g., temperature, humidity, gas particulates, pressure, flow rate, or the like, or any suitable combinations thereof). The steady state gain K is calculated by the system identifier 310 as discussed further below.

However, the present disclosure is not limited thereto, and in other embodiments, the actual runtime circuit 314 may include one or more time keeping devices (e.g., 8-bit timers, 16-bit timers, 32-bit timers, etc.) to record the length of time that the equipment was run. For example, in this case, when the HVAC controller 320 enables the HVAC equipment 346 to either heat or cool, the actual runtime circuit 314 can be configured to record the length of time the equipment was run, the starting and ending times of the run, and/or the like. The actual runtime 322 may indicate the amount of time that the HVAC equipment 346 was run for during a period under consideration (e.g., a year, month, week, day, hour, and/or minute).

In some embodiments, the memory 308 includes an estimated runtime circuit 312. The estimated runtime circuit 312 generates an estimated runtime 328 corresponding to one or more different setpoints or schedules (e.g., different temperature setpoints or schedules) than the actual setpoint or schedule (e.g., the actual temperature setpoint or schedule) used or set. In some embodiments, the estimated runtime circuit 312 calculates a difference between the actual runtime ($f_{on,act}$) 322 and a theoretical runtime for the different setpoint(s) or schedule(s) (e.g., different temperature setpoint(s)). For example, from equations 1 and 2, a difference between the actual runtime ($f_{on,act}$) 322 and a runtime ($f_{on,sp}$) predicted for an average temperature setpoint $T_{sp}$ can be calculated by equation 3:

$$f_{on,sp} = -f_{on,act} = \frac{T_{sp} - \overline{T_r}}{K} \quad (3)$$

When the temperature setpoint is changed to a different temperature setpoint during the period under consideration, equation 3 can be rewritten as equation 4:

$$f_{on,sp} - f_{on,act} = \frac{\overline{e}}{K}, \quad (4)$$

where $\overline{e}$ is defined by equation 5:

$$\overline{e} = \frac{1}{N}\sum_{i=1}^{N} T_{sp,i} - T_{r,i} \quad (5)$$

where N is a number of samples over the period under consideration.

In some embodiments, estimated runtime circuit 312 does not store all of the values for $T_{sp,i}$ and $T_{r,i}$ in order to evaluate the fractional savings (or reduction) in runtime for the different temperature setpoint. Instead, estimated runtime circuit 312 converts batch averaging of the fractional savings (or reduction) into a running average calculation. For example, if $\Delta f_{on} = f_{on,sp} - f_{on,act}$, then the difference for a particular sample i can be calculated using equation 6:

$$\Delta f_{on,i} = \Delta f_{on,i-1} + \frac{1}{i}\left(\frac{T_{sp,i} - T_{r,i}}{K} - \Delta f_{on,i-1}\right), \quad (6)$$

where $i \geq 1$ and $\Delta f_{on,0} = 0$. Accordingly, in some embodiments, using equation 6, the estimated runtime circuit 312 calculates the estimated runtime 328 for estimating the fractional savings (or reduction) in runtime compared to one or more alternative (or different) setpoints. In some embodiments, equation 6 is preferable to equation 5, because it does not require that all of the values for $T_{sp,i}$ and $T_{r,i}$ to be stored, and thus, reduces data storage requirements. However, the present disclosure is not limited thereto, and in other embodiments, estimated runtime circuit 312 can utilize stored values for $T_{sp,i}$ and $T_{r,i}$ (e.g., stored internally or externally) to calculate the estimated runtime 328 utilizing equation 5.

In some embodiments, the one or more alternative (or different) setpoints or schedules can be user defined. For example, in some embodiments, the user can interact with the thermostat 10 to specify one or more different temperature setpoints or schedules, and the estimated runtime circuit 312 can generate the fractional savings (or reduction) in runtime for each of the one or more different temperature setpoints or schedules. In some embodiments, the thermostat 10 may receive one or more alternative (or different) setpoints or schedules from a cloud platform. For example, in some embodiments, the cloud platform may receive data from a plurality of thermostats or building management systems. In this case, the cloud platform may provide one or more alternative (or different) setpoints or schedules to thermostat 10 that have been used by other thermostats associated with buildings (e.g., a residence) having one or more attributes (e.g., building attributes) that are similar to those of residence 24. In some embodiments, the one or more alternative setpoints or schedules may be fixed. For example, in some embodiments, the alternative setpoint or schedule may correspond to a fixed interval (e.g., 1 degree, 2 degrees, and/or the like) from the actual setpoint or schedule.

In some embodiments, the memory 308 includes a system identifier 310. The system identifier 310 is configured to calculate and/or store a gain estimate 324 of the steady state gain K. In some embodiments, the system identifier 310 provides the gain estimate 324 to the estimated runtime circuit 312 to calculate the estimated runtime 328. In some embodiments, the system identifier 310 calculates the gain estimate 324 based on a balance point (e.g., a balance point temperature) $T_b$. The balance point temperature $T_b$ is defined as the outdoor temperature at which the heat gains in the building (or residence) are equal to or substantially equal to the heat losses. For example, for heating, when the outdoor temperature is below the balance point temperature $T_b$, additional heating is generally required to achieve the temperature setpoint. On the other hand, if the outdoor temperature is equal to or substantially equal to the balance point temperature $T_b$, no additional heating is required because internal gains are sufficient to achieve the temperature setpoint. Similarly, for cooling, when the outdoor temperature is above the balance point temperature $T_b$, additional cooling is generally required to achieve the temperature setpoint, whereas when the outdoor temperature is equal to or substantially equal to the balance point temperature $T_b$, no additional cooling is required.

In some embodiments, the system identifier 310 calculates the balance point (or balance point temperature) $T_b$ using equation 7:

$$T_b = T_{stat} - \frac{Q_{IHG} + Q_{SOL}}{U_{BLDG}} \quad (7)$$

where $T_{stat}$ is the setpoint (e.g., temperature setpoint) set at the thermostat 10, $Q_{IHG}$ is the internal gain, $Q_{SOL}$ is the gain due to solar radiation, and $U_{BLDG}$ is the rate of transfer (heating or cooling) across the building. For example, in some embodiments, the system identifier 310 is configured to receive various inputs (e.g., OAT 330, ZNT 332, setpoint 333, and/or the like) from the HVAC controller 320 and/or various outputs (e.g., heating outputs 334 and/or the cooling outputs 336), and determines the balance point (e.g., balance point temperature) $T_b$ based on the inputs and/or outputs and equation 7. In some embodiments, the system identifier 310 records a historical database of inputs and outputs and updates the balance point (e.g., balance point temperature) $T_b$ based on the historical inputs and/or outputs.

However, the balance point (e.g., balance point temperature) $T_b$ may not be easily calculated based on equation 7, especially when data (e.g., inputs and outputs data) are sparse. In this case, in some embodiments, the system identifier 310 estimates the balance point (e.g., balance point temperature) $T_b$. For example, based on empirical data, the balance point temperature for most residences have been determined to be in the range of 55 degrees to 65 degrees Fahrenheit. Thus, assuming that this range has been calculated for a thermostat setting of 72 degrees Fahrenheit, then the balance point temperature is typically equal to or substantially equal to 12 degrees Fahrenheit less than the thermostat setting (assuming a mid-range value of 60 degrees Fahrenheit for the typical balance point temperature). In this case, the system identifier 310 estimates the balance point temperature $T_b$ using equation 8:

$$T_b = T_{sp} - 12 \tag{8}$$

For heating, the additional heat required to reach the setpoint is proportional to the difference between the balance point temperature $T_b$ and the outdoor temperature ($T_{oat}$) OAT 330. Thus, the additional heat required to reach the setpoint ($f_{on}K$) is defined by equations 9 and 10:

$$f_{on}K = T_b - T_{oat} \tag{9}$$
$$= T_{sp} - 12 - T_{oat} \tag{10}$$

Accordingly, the system identifier 310 can estimate the gain $\hat{K}$ from the actual runtime ($f_{on,act}$) 322 and the actual room temperature ($T_r$) using equation 11:

$$\hat{K} = \frac{1}{Nf_{on,act}} \sum_{i=1}^{N} (T_{r,i} - T_{oat,i} - 12) \tag{11}$$

In some embodiments, the memory 308 includes a runtime savings controller 316. The runtimes savings controller 316 calculates the fractional runtime savings (or reduction) 326 at a sample time i. In some embodiments, the runtime savings controller 316 calculates the actual on runtime over a sample period $\Delta t$, the savings on runtime over the sample period $\Delta t$, and the predicted on runtime over the period $\Delta t$. In some embodiments, the runtime savings controller 316 stores the fractional runtime savings 326, the actual on runtime, the savings on runtime, and/or the predicted on runtime. In some embodiments, the runtime savings controller 316 provides the fractional runtime savings 326, the actual on runtime, the savings on runtime, and/or the predicted on runtime to the user interface controller 318 for display on the user interface 14. In some embodiments, the runtime savings controller 316 automatically adjusts the current temperature setpoint or schedule based on the potential savings in run time or energy usage of a theoretical or different temperature setpoint or schedule than the one currently used.

For example, in some embodiments, the runtime savings controller 316 calculates the fractional runtime savings 326 at the sample time i by evaluating the running averages $r1_i$, $r2_i$, and $r3_i$ using equations 12, 13, and 14, respectively:

$$r1_i = r1_{i-1} + \frac{(T_{sp,i} - T_{r,i}) - r1_{i-1}}{i}, \tag{12}$$

$$r2_i = r2_{i-1} + \frac{(T_{r,i} - 12 - T_{oat,i}) - r2_{i-1}}{i}, \tag{13}$$

$$r3_i = r3_{i-1} + \frac{u_i - r3_{i-1}}{i}, \tag{14}$$

where $u_i$ is the on/off signal (e.g., 0 or 1) to the heating or cooling unit.

From equations 12, 13, and 14, the runtime savings controller 316 calculates the fractional runtime savings (or reduction) 326 using equation 15:

$$\Delta f_{on,i} = \frac{r1_i r3_i}{r2_i} \tag{15}$$

Assuming that data is obtained at a fixed sample period of $\Delta t$, runtime savings controller 316 calculates the period of time for the actual on runtime, the savings on runtime, and the predicted on runtime using equations 16, 17, and 18, respectively:

$$\text{actual on runtime} = \Delta t \times i \times r3_i \tag{16}$$

$$\text{savings on runtime} = \Delta t \times i \times \frac{r1_i r3_i}{r2_i} \tag{17}$$

$$\text{predicted on runtime} = \text{actual on runtime} + \text{savings on runtime} \tag{18}$$

In other embodiments, the system identifier 310 calculates the gain estimate 324 based on oscillation amplitude. Generally, the amplitude of the oscillation in a controlled variable (e.g., room temperature) is determined by the on and off times of the heating/cooling equipment and by the dynamic and static characteristics of the system (e.g., HVAC+room). For example, cycling the heating/cooling equipment faster can reduce the amplitude, while slower cycling can increase the amplitude. Thus, for a fixed cycle frequency, a larger gain and/or a smaller time constant will lead to a larger amplitude, while a smaller gain and/or larger time constant will lead to a smaller amplitude.

For example, the observed amplitude of oscillation in the room temperature coupled with the observed on and off times can be used to determine properties of the system. If a model form is assumed for the system, a relationship can be constructed between the observed amplitude of the oscillation and the on and off times. For example, assume a simple first-order model with a static gain $K_p$ (e.g., steady state temperature gain) with the following Laplace transfer function shown in equation 19:

$$G(s) = \frac{K_p}{1 + T_p S} \tag{19}$$

where $T_p$ is the system time constant and $K_p$ is the static gain (e.g., steady state temperature gain). The amplitude of oscillation is derived by equation 20:

$$A = 0.5K_p\left(1 - \exp\left(\frac{(t_{on} - t_{cycle})}{T_p}\right)\right)\frac{1 - \exp\left(\frac{-t_{on}}{T_p}\right)}{1 - \exp\left(\frac{-t_{cycle}}{T_p}\right)} \quad (20)$$

where $t_{on}$ is the on time and $t_{cycle}$ is the cycle time.

Although more complex relationships could be developed for higher order models, this simple form can characterize most rooms reasonably well. However, a potential problem is that the relationship has two unknown properties: the static gain $K_p$ and the time constant $T_p$. Both these variables affect the amplitude of oscillation for a given on/off cycle and it is not possible to determine both of these values without additional information. Generally, full system identification can become intractable when the system is not in a steady-state condition at any point in the data. Accordingly, in some embodiments, the system identifier 310 assumes a default value for the time constant $T_p$, since the time constant $T_p$ is not expected to change with conditions in the same way as the static gain $K_p$. Moreover, the time constant $T_p$ could be expected to be very similar over a broad range of buildings and systems. So, given an assumed time constant $T_p$, a measured amplitude A, and average on and cycle times $t_{on}$ and $t_{cycle}$, the estimated runtime circuit 312 determines the static gain $K_p$ using equation 20. Once the static gain $K_p$ is calculated, the estimated runtime circuit 312 or the runtime savings controller 316 calculates the runtime savings as discussed above.

In still other embodiments, the system identifier 310 can calculate the static gain $K_p$ without having to store the values for the amplitude A, the average on time $t_{on}$, and cycle time $t_{cycle}$ over a given time period (e.g., one day). For example, in some embodiments, the system identifier 310 can calculate a value $r4_i$ at sample i used to estimate the average frequency of changes in the on/off signal, and $r5_i$ used to calculate a mean-squared error at sample i of the room temperature compared to its setpoint using equations 21 and 22:

$$r4_i = r4_{i-1} + |u_i - u_{i-1}| \quad (21)$$

$$r5_i = r5_{i-1} + \frac{(T_{sp,i} - T_{r,i})^2 - r5_{i-1}}{i} \quad (22)$$

Then, for a signal that approximates a triangular wave, the system identifier 310 can calculate the amplitude A at sample i from the mean-squared error $r5_i$ using equation 23:

$$A = \sqrt{r5_i \times 3} \quad (23)$$

The system identifier 310 can also calculate the cycle period $t_{cycle}$ at sample i from equation 24:

$$t_{cycle} = \frac{2i\Delta t}{r4_i} \quad (24)$$

where $\Delta t$ is the sample period of the data. The system identifier 310 can then calculate the on time $t_{on}$ at sample i from $r3_i$ (i.e., equation 14) using equation 25:

$$t_{on} = r3_i t_{cycle} \quad (25)$$

The system identifier 310 can then substitute the values of the amplitude A and the on and cycle times $t_{on}$ and $t_{cycle}$ derived from equations 23-25 into equation 20 to determine the static gain $K_p$. Once the static gain $K_p$ is calculated, the estimated runtime circuit 312 or the runtime savings controller 316 calculates the runtime savings (or reduction in runtime) as discussed above.

In some embodiments, the runtime savings controller 316 compares the predicted on runtime for one or more theoretical or different setpoints or schedules (e.g., different temperature setpoints or schedules) with the actual on runtime of the currently used setpoint or schedule (e.g., the currently set temperature setpoint or schedule) to determine if any of the different setpoints or schedules (e.g., the different temperature setpoints or schedules) would likely result in savings in run time, energy usage, and/or costs. For example, in some embodiments, the runtime savings controller 316 may convert the runtime savings (or reduction in runtime) to a corresponding amount of energy savings. For example, in some embodiments, the runtime savings controller 316 may determine an amount of energy required to run the HVAC equipment over a period of time, and may multiply the required amount of energy by the runtime savings (or reduction in runtime) over the same period of time, such that the amount of energy savings can be calculated for the predicted runtime savings (or predicted reduction in runtime). In various embodiments, the amount of energy required by the HVAC system may be measured by the thermostat (e.g., by measuring the amount of energy actually used by the HVAC equipment whenever the HVAC equipment is in an on state), may be estimated or calculated based on an identifier or type of the HVAC equipment (e.g., based on the amount of energy required by that particular HVAC equipment or generally required by that type of HVAC equipment when in an on state), or may be provided by an external system or device (e.g., measured or calculated by a BMS, a cloud computing device, or the like).

In another example, in some embodiments, the runtime savings controller 316 may convert the runtime savings (or reduction in runtime) to a corresponding amount of cost savings (or reduction in costs). For example, in some embodiments, the runtime savings controller 316 may measure, calculate, or determine energy costs for running the HVAC equipment over a period of time, and may multiple the energy costs by the runtime savings (or reductions in runtime) over the same period of time, such that the amount of cost savings (or reduction in energy costs) can be calculated based on the predicted runtime savings (or predicted reduction in runtime). In various embodiments, the runtime savings controller 316 may consider the time of day, time of month, peak pricing, off peak pricing, tiered pricing, and/or the like of the energy costs for running the HVAC equipment when calculating the energy savings associated with the predicted runtime savings, such that the energy savings (or reduction in energy costs) reflect the actual energy prices over the same sample period of the runtime savings.

In some embodiments, if the runtime savings controller 316 determines that the predicted on runtime for the different setpoints or schedules is likely to result in savings, the runtime savings controller 316 can automatically adjust the currently used setpoint or schedule to the different setpoint or schedule to operate the HVAC equipment according to the adjusted setpoint or schedule. For example, in some embodiments, the runtime savings controller 316 may automatically adjust the temperature setpoint or schedule when the resulting savings exceeds a user defined or predetermined threshold savings value. In other embodiments, the runtime savings controller 316 can automatically adjust the temperature setpoint or schedule whenever it determines that any savings can result.

In some embodiments, the user interface controller 318 is configured to cause the user interface 14 to display various runtime information (e.g., fractional runtime savings 326, actual on runtime, savings on runtime, predicted on runtime, and/or the like) and/or allow the user to interact with the runtime information. In some embodiments, the user interface controller 318 is configured to display various graphics, charts, and/or other indications of the runtime information for various periods of time (e.g., hours, days, weeks, months, years, etc.). In this regard, in some embodiments, the user interface controller 318 is configured to store the runtime information for various hours, days, months, and/or years. In some embodiments, the user can interact with the user interface 14 to set parameters of when to automatically adjust the temperature setpoint or schedule based on the potential runtime savings. For example, the user can set the threshold savings value or level, such as optimum level of savings or optimal comfort level regardless of the potential savings. In some embodiments, the user can specify a policy (e.g., occupant comfort, energy savings, nighttime, day time, time of year, and/or the like) and the thermostat 10 may automatically adjust the temperature setpoint or schedule based on the estimated runtime(s) and the policy. In some embodiments, the user is presented via the user interface 14 the various runtime information and can define the setpoint or schedule based on the various runtime information. For example, in some embodiments, the user can assess the tradeoff between occupant comfort and the potential savings in energy costs based on the various runtime information in order to set the setpoint or schedule.

In some embodiments, the user interface controller 318 may display savings information for one or more theoretical or different setpoints or schedules, and may prompt the user to select or authorize a setpoint or schedule change to one of the theoretical or different setpoints or schedules based on the savings information. For example, in some embodiments, the user interface controller 318 may display the potential cost savings for each of the one or more potential temperature setpoints (e.g., theoretical or different temperature setpoints) and may enable the user to select or authorize one of the potential temperature setpoints, such that the temperature setpoint is automatically changed to the selected or authorized temperature setpoint. In some embodiments, the user interface controller 318 may display an amount of the potential temperature setpoint change with the potential cost savings associated with the potential temperature setpoint change, such that the user can access the tradeoffs between comfort and potential savings. For example, in some embodiments, the user interface controller 318 may display an amount of the potential temperature setpoint change (e.g., 1 degree, 2 degrees, and/or the like) along with the corresponding amount of potential cost savings (e.g., $5, $15, and/or the like) for each of the potential temperature setpoint changes, such that the user can select or authorize one of the potential temperature setpoint changes based on the amount of change and the savings in cost associated with the change. Accordingly, in various embodiments, the user interface controller 318 simplifies user control of the setpoint or schedule by providing relevant real-time savings information to the user and enabling the user to quickly select or authorize the setpoint or schedule change based on the savings information.

While the above equations 11 through 15 are described with reference to a heating application, for cooling, a portion of the gain K is needed when the outdoor temperature OAT 330 is greater than the desired room temperature minus 12 degrees Fahrenheit. Thus, the estimate for the gain $\hat{K}$ for cooling using equation 11 will result in a negative gain for cooling. The difference between the reference setpoint $T_{sp}$ and the actual room temperature $T_r$, that drives the calculation of runtime savings (e.g., as in equation 13) also results in a negative value when the reference temperature is lower than the actual temperature, and thus, the fractional runtime savings 326 calculation using equation 15 cancels the two negative values of r1 and r2. Accordingly, a correct estimate of runtime savings for cooling can be calculated.

Figure 3B:
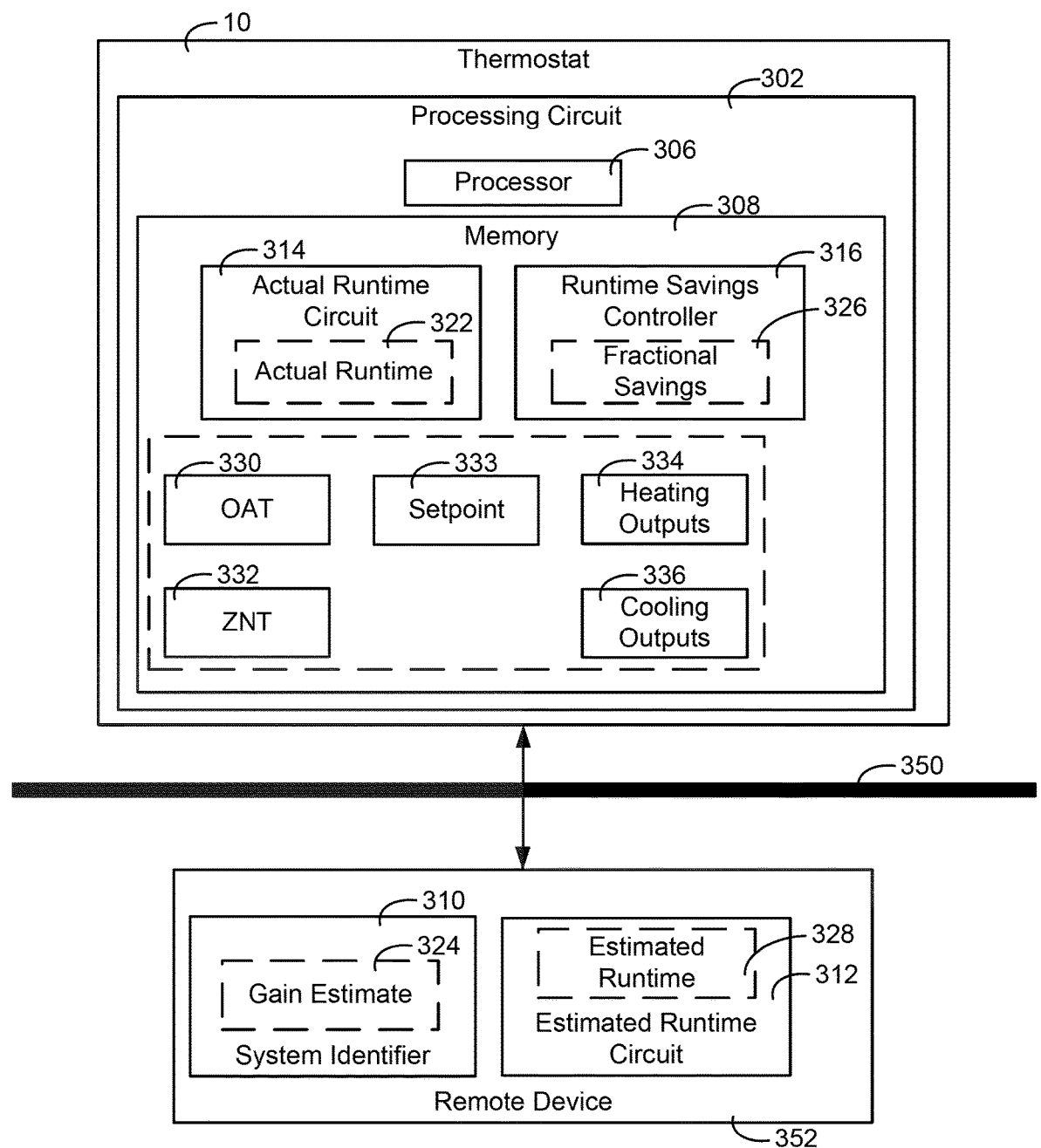
FIG. 3B is a block diagram of the thermostat of FIG. 3A communicating with a remote device, according to an exemplary embodiment.

Referring now to FIG. 3B, the thermostat 10 is shown communicating with a remote device 352, according to an exemplary embodiment. In FIG. 3B, the thermostat 10 may receive the gain estimate 324 and/or the estimated runtime 328 from the remote device 352, rather than calculating the gain estimate 324 and/or the estimated runtime 328 by itself. FIG. 3B is shown to include a network 350. The remote device 352 may be a remote server or cloud computing platform. In various embodiments, the remote device 352 is a smartphone, tablet, laptop computer, desktop computer, or any other suitable device configured to perform the functions of thermostat 10 (e.g., configured to implement the system identifier 310 and/or the estimated runtime circuit 312). In some embodiments, the remote device 352 is an Android or Apple iOS based device including a mobile application configured to allow the device to implement the functionality of the thermostat 10 (e.g., configured to implement the system identifier 310 and/or the estimated runtime circuit 312). In some embodiments, the remote device 352 includes a processing circuit including a processor and memory, which may be the same as or similar to the processing circuit 302, processor 306, and memory 308 of the thermostat 10. In the embodiment of FIG. 3B, the system identifier 310 and estimated runtime circuit 312 may be located within the memory of the remote device 352.

As shown in FIG. 3B, the thermostat 10 and the remote device 352 may be components of a distributed computing system having a plurality of computing devices (e.g., the thermostat 10, the remote device 352, any other devices, etc.). The plurality of computing devices may be located within the same network or distributed across multiple networks and communicably coupled to each other (i.e., configured to communicate with each other). For example, the thermostat 10 may be located within a building space and the remote device 352 may be a building management system computer, local server, or other device within the building. As another example, the thermostat 10 may be located within a building space, whereas the remote device 352 may be a component of a cloud computing platform or remote server outside the building. The functionality of the thermostat 10, as described with respect to FIG. 3A, may be distributed across the plurality of computing devices such that different functions are performed by different devices. For example, the thermostat 10 (an embodiment of a space controller) be configured to determine the actual runtime that the HVAC equipment is in the on state based on the first setpoint or schedule and adjust the first setpoint or schedule to the second setpoint or schedule based on the reduction of runtime, whereas the remote device 352 may be configured to estimate the steady state gain of the controlled variable of the HVAC system and predict the reduction of runtime that the HVAC equipment is in the on state for the second setpoint or schedule based on the actual runtime and the steady state gain.

In some embodiments, network 350 may include the Internet and/or other types of data networks, such as a local area network (LAN), a wide area network (WAN), a cellular network, a satellite network, or any other type of data network or combination thereof. The network 350 may include any number of computing devices (e.g., computers, servers, routers, network switches, etc.) configured to transmit, receive, or relay data. The network 350 may further include any number of hardwired and/or wireless connections. For example, the thermostat 10 may communicate wirelessly (e.g., using a WiFi or cellular radio, etc.) with a transceiver that is hardwired (e.g., via a fiber optic cable, Ethernet, a CAT5 cable, etc.) to a computing device (e.g., the remote device 352) in communication with the network 350. The network 350 may include services that facilitate managing the wireless and/or wired communication of devices connected to the network 350. Network vendors may include, for example, cellular telecommunications providers (e.g., Verizon, T-Mobile, AT&T, etc.) as well as interne service providers.

In some embodiments, the thermostat 10 is configured to transmit the OAT 330, the heating outputs 334, the ZNT 332, the current setpoint 333, and/or the cooling outputs 336 to the remote device 352 via the network 350. The thermostat 10 may send the data as historical data entries, e.g., data for various points in time for a day, week, month, or year. The remote device 352 can be configured to receive the data and calculate the gain estimate 324 for the thermostat via the system identifier 310. The remote device 352 can be configured to generate the estimated runtime 328 using the gain estimate 324 with the estimated runtime circuit 312. The remote device 352 can transmit the gain estimate 324 and/or the estimated runtime 328 to the thermostat 10 via the network 350.

While the above equations have been described with reference to a single state on/off heating and cooling unit, the present disclosure is not limited thereto. For example, for a multi-stage heating and cooling unit, a modification to equation 14 may be made to consolidate the on/off signals for each of the stages into the variable $u_i$.

For example, according to one embodiment, this can be accomplished by representing each stage as a fraction of the total capacity. In a non-limiting example of a two-stage heating and cooling unit of equal capacity, the on/off signals for each of the stages can be scaled to pulse between 0 and 0.5, so that the sum of the signals when both are on would equal 1. In this case, a savings estimate in terms of the runtime of both stages can be generated (e.g., a savings estimate of 50% would mean a savings of 50% in the runtime of both stages, or the equivalent of a savings of 100% of one whole stage of the period).

In another example embodiment, this can be accomplished by summing each of the on/off signals from each stage (scaled by capacity) to calculate $u_i$. In a non-limiting example of a two-stage heating and cooling unit of equal capacity, each stage can be assigned a value between 0 and 1, so that the maximum value for $u_i$ is 2. In this case, a savings estimate in terms of an individual stage runtime can be generated (e.g., a savings estimate of 50% would mean that 50% of one stage runtime was saved).

Figure 4:
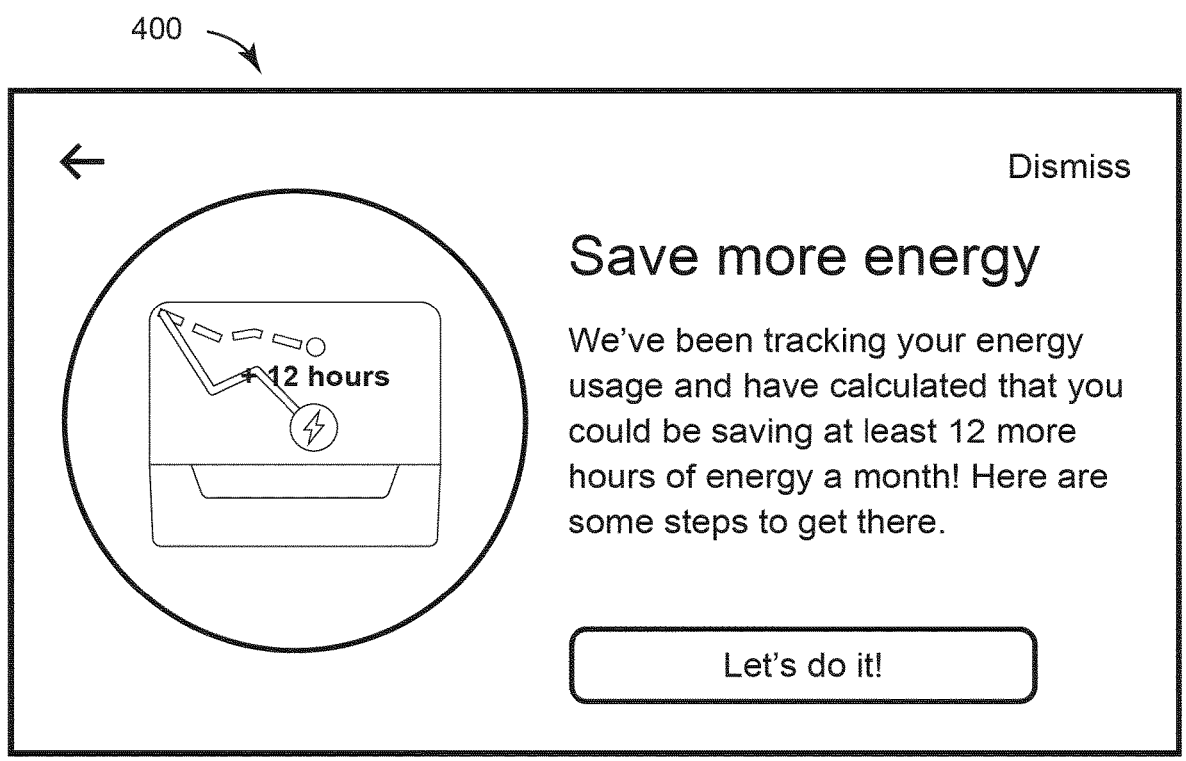
FIG. 4 is a user interface of the thermostat for displaying an energy savings notification to a user of the thermostat.

FIG. 4 is a user interface 400 for displaying runtime savings to a user via the user interface 14, according to an exemplary embodiment. While FIG. 4 shows an example user interface for a thermostat, the present disclosure is not limited thereto, and the user interface 14 may be a user interface for any suitable space controller (e.g., a thermostat (head or headless), a humidity controller, gas particulate controller, air flow controller, pressure controller, or any other suitable controller device). Referring to FIG. 4, if the thermostat 10 determines that more energy savings can be accomplished by using a different temperature setpoint or setpoint schedule than the one currently used, a notification may appear in the form of the interface 400 to guide the user through steps to increase the energy savings. In some embodiments, the notification may be generated whenever the thermostat 10 determines a more optimal temperature setpoint or setpoint schedule. In other embodiments, the notification may be generated if the energy savings calculated for a different temperature setpoint or schedule exceeds a predefined amount of energy over a period of a predefined amount of time (e.g., hour, day, month, year, and/or the like).

While various embodiments of the present disclosure have been described in the context of controlling the runtime of HVAC equipment based on a temperature setpoint or schedule, the present disclosure is not limited thereto, and various aspects and features of the present disclosure can be applied for controlling the runtime of any suitable systems and devices based on any suitable controlled variable or parameter. For example, in another embodiment, the above equations may be variously modified to control the runtime of humidifier/dehumidifier equipment based on a humidity setpoint or schedule. In this case, for example, the same or substantially the same equations discussed above (e.g., equations (1)-(25)) may be used to estimate the runtime savings (or reduction in runtime) of the humidifier/dehumidifier equipment based on one or more theoretical humidity setpoints or schedules, except the controlled variables in the equations would be based on humidity levels (e.g., humidity setpoint, average room humidity levels, steady state humidity gain, and/or the like) instead of temperature (e.g., temperature setpoint, average room temperature, steady state temperature gain, and/or the like).

For example, in some embodiments, the actual runtime circuit 314 may use equation (1) to determine a fraction (or percentage) of time that the humidifier/dehumidifier equipment is spent in the on state ($f_{on,sp}$) in order to achieve an average humidity setpoint ($T_{sp}$) that is between a steady-state humidity level when the humidifier/dehumidifier equipment is in the on state ($T_{r,on}$) and a steady state humidity level when the humidifier/dehumidifier equipment is in the off state ($T_{r,off}$). Of course, in other embodiments, the actual runtime circuit 314 may include one or more time keeping devices (e.g., 8-bit timers, 16-bit timers, 32-bit timers, etc.) to record the length of time that the humidifier/dehumidifier equipment was run to determine the actual runtime (or fractional runtime) of the humidifier/dehumidifier equipment to maintain the humidity levels associated with the set humidity setpoint.

Similarly, in some embodiments, the estimated runtime circuit 312 may generate an estimated runtime 328 corresponding to one or more different humidity setpoints than the actual humidity setpoint used, using any of equations (3)-(6) discussed above. For example, in some embodiments, the estimated runtime circuit 312 may calculate a difference between the actual runtime ($f_{on,act}$) and a runtime ($f_{on,sp}$) predicted for an average humidity setpoint $T_{sp}$ using equations (3)-(5), or may covert batch averaging of the fractional savings (or reduction in runtime) into a running average calculation using equation (6). In this case, for example, the system identifier 310 may calculate and/or store a steady state humidity gain estimate K corresponding to the controlled variable (e.g., humidity) using a balance point humidity $T_b$ using any of equations (7)-(11), or may calculate and/or store the steady state humidity gain estimate K based on an oscillation amplitude of the humidifier/dehumidifier equipment using any of equations (19)-(25), where any controlled variables in the corresponding equations associated with temperature (e.g., balance point temperature $T_b$, temperature setpoint $T_{stat}$, outdoor temperature $T_{oat}$, average room temperature $T_r$, and/or the like) is modified to the associated humidity variables (e.g., balance point humidity $T_b$, humidity setpoint $T_{stat}$, outdoor humidity level $T_{oat}$, average room humidity levels $T_r$, and/or the like).

However, the present disclosure is not limited thereto, and while temperature and humidity are provided as non-limiting examples, the aspects and features of the present disclosure may be applicable to reducing the runtime of any suitable devices or systems based on any suitable controlled variable or parameter. For example, in various embodiments, the controlled variable may include or be based on the temperature setpoint, the humidity setpoint, gas particulates level setpoint, flow rate setpoint, air quality setpoint, pressure setpoint, and/or the like, or any suitable combinations thereof. Similarly, for example, in various embodiments the steady state gain K for the corresponding controlled variable may include or be based on the steady state temperature gain, the steady state humidity gain, a steady state gas particulates gain, a steady state flow rate gain, a steady state air quality gain, a steady state pressure gain, and/or the like, or any suitable combinations thereof.

Further, in some embodiments, the setpoint or schedule may include derivative values that are derived based on one or more of the temperature setpoint, the humidity setpoint, gas particulates level setpoint, flow rate setpoint, air quality setpoint, pressure setpoint, and/or the like, or any suitable combinations thereof. For example, in some embodiments, the setpoint or schedule may include a derivative value (e.g., F) that is calculated based on a corresponding setpoint or schedule (e.g., temperature setpoint) or a combination of any suitable setpoints, controlled variables, or parameters (e.g., F=mT+c). In some embodiments, the setpoint or schedule and/or steady state gain K may include or be based on a new controlled variable (e.g., F) or parameter that is calculated from one or more of temperature, humidity, flow rate, air quality, pressure, and/or the like, or any suitable combinations thereof, such that the reduction in runtime of the associated equipment, systems, and/or devices may be predicted using any of the above-described equations, where the setpoint and steady state gain (K) is associated with the new controlled variable or parameter F, instead of temperature or humidity, for example.

Accordingly, the aspects and features of the various embodiments described herein may be applied to any suitable systems and devices that control the runtime of equipment or devices using a controlled variable or parameter, such as a temperature setpoint, humidity setpoint, flow rate, air quality, pressure, a calculated controlled variable or parameter, any other suitable controlled variables or parameters, any combinations thereof, and/or the like, such that the estimated runtime savings (or reduction in runtime) for one or more theoretical controlled variables or parameters can be calculated and/or used to reduce the energy usage of the associated equipment and/or devices.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A method for determining energy savings of a space controller, the method comprising:
    estimating, by one or more processing circuits, a steady state gain of a controlled variable of a heating, ventilation, or air conditioning (HVAC) system, the steady state gain defining a difference between a steady state value of the controlled variable when the HVAC system is active and a steady state value of the controlled variable when the HVAC system is inactive;

determining, by the one or more processing circuits, an actual runtime that HVAC equipment of the HVAC system is in an on state based on a first setpoint or schedule;

predicting, by the one or more processing circuits, a reduction of runtime that the HVAC equipment is in the on state for a second setpoint or schedule based on the actual runtime and the steady state gain; and adjusting, by the one or more processing circuits, the first setpoint or schedule to the second setpoint or schedule based on the reduction of runtime.

2. The method of claim 1, wherein the controlled variable comprises at least one of temperature, humidity, gas particulate level, flow rate, air quality, pressure, or combinations thereof.

3. The method of claim 1, wherein the first setpoint and the second setpoint comprise at least one of temperature setpoints, humidity setpoints, gas particulate level setpoints, flow rate setpoints, air quality setpoints, pressure setpoints, or derivatives thereof.

4. The method of claim 1, wherein the space controller comprises at least one of a thermostat with an integrated user interface or a headless thermostat.

5. The method of claim 1, wherein the steady state gain of the controlled variable is estimated based on a balance point corresponding a state of a building at which gains of the controlled variable within the building are equal to losses of the controlled variable within the building.

6. The method of claim 1, wherein the steady state gain of the controlled variable is estimated based on a measured oscillation amplitude of the HVAC equipment, a time constant, an average on time of the HVAC equipment, and an average cycle time of the HVAC equipment.

7. The method of claim 1, wherein the steady state gain of the controlled variable is estimated based on an estimated oscillation amplitude of the HVAC equipment calculated at a sample time from a mean-squared error of the controlled variable compared to the first setpoint at the sample time, a cycle period calculated based on an average frequency of changes of an on/off state of the HVAC equipment over a sample period, and an on time calculated at the sample time based on the cycle period.

8. The method of claim 1, wherein the reduction of runtime corresponds to a difference between the actual runtime and an estimated runtime of the HVAC equipment for the second setpoint or schedule, the difference calculated based on the steady state gain of the controlled variable.

9. The method of claim 1, wherein the adjusting of the first setpoint or schedule to the second setpoint or schedule comprises:

displaying, by the one or more processors, an indicator corresponding to the reduction of runtime for the second setpoint or schedule on a display device associated with the space controller;

receiving, by the one or more processors, a selection of the second setpoint or schedule; and adjusting, by the one or more processors, the first setpoint or schedule to the second setpoint or schedule in response to the selection.

10. The method of claim 1, wherein the adjusting of the first setpoint or schedule to the second setpoint or schedule comprises:

estimating, by the one or more processors, a reduction of energy consumption based on the reduction of runtime for the second setpoint or schedule;

comparing, by the one or more processors, the reduction of energy consumption with a threshold value; and adjusting, by the one or more processors, the first setpoint or schedule to the second setpoint or schedule in response to the comparison.

11. A space controller comprising:

a processor; and non-transient memory including instructions that, when executed by the processor, cause the processor to:

estimate a steady state gain of a controlled variable of a heating, ventilation, or air conditioning (HVAC) system, the steady state gain defining a difference between a steady state value of the controlled variable when the HVAC system is active and a steady state value of the controlled variable when the HVAC system is inactive;

determine an actual runtime that HVAC equipment of the HVAC system is in an on state based on a first setpoint or schedule;

predict a reduction of runtime that the HVAC equipment is in the on state for a second setpoint or schedule based on the actual runtime and the steady state gain; and adjust the first setpoint or schedule to the second setpoint or schedule based on the reduction of runtime.

12. The space controller of claim 11, wherein:

the controlled variable comprises at least one of temperature, humidity, gas particulate level, flow rate, air quality, pressure, or combinations thereof; and the first setpoint and the second setpoint comprise at least one of temperature setpoints, humidity setpoints, gas particulate level setpoints, flow rate setpoints, air quality setpoints, pressure setpoints, or derivatives thereof.

13. The space controller of claim 11, wherein the space controller comprises at least one of a thermostat with an integrated user interface or a headless thermostat.

14. The space controller of claim 11, wherein the instructions further cause the processor to estimate the steady state gain of the controlled variable based on a balance point corresponding a state of a building at which gains of the controlled variable within the building are equal to losses of the controlled variable within the building.

15. The space controller of claim 11, wherein the instructions further cause the processor to determine the steady state gain of the controlled variable based on a measured oscillation amplitude of the HVAC equipment, a time constant, average on time of the HVAC equipment, and average cycle time of the HVAC equipment.

16. The space controller of claim 11, wherein the instructions further cause the processor to determine the steady state gain of the controlled variable based on an estimated oscillation amplitude of the HVAC equipment calculated at a sample time from a mean-squared error of the controlled variable compared to the first setpoint at the sample time, a cycle period calculated based on an average frequency of changes of an on/off state of the HVAC equipment over a sample period, and an on time calculated at the sample time based on the cycle period.

17. The space controller of claim 11, wherein to adjust the first setpoint or schedule to the second setpoint or schedule, the instructions further cause the processor to:

display an indicator corresponding to the reduction of runtime for the second setpoint or schedule on a display device associated with the space controller;

receive a selection of the second setpoint or schedule; and adjust the first setpoint or schedule to the second setpoint or schedule in response to the selection.

18. The space controller of claim 11, wherein to adjust the first setpoint or schedule to the second setpoint or schedule, the instructions further cause the processor to:
- estimate a reduction of energy consumption based on the reduction of runtime for the second setpoint or schedule;
- compare the reduction of energy consumption with a threshold value; and
- adjust the first setpoint or schedule to the second setpoint or schedule in response to the comparison.

19. A distributed computing system comprising:
a plurality of computing devices comprising one or more processors and non-transient memory storing instructions that, when executed by the one or more processors, cause the one or more processors to:
- estimate a steady state gain of a controlled variable of a heating, ventilation, or air conditioning (HVAC) system, the steady state gain defining a difference between a steady state value of the controlled variable when the HVAC system is active and a steady state value of the controlled variable when the HVAC system is inactive;
- determine an actual runtime that HVAC equipment of the HVAC system is in an on state based on a first setpoint or schedule;
- predict a reduction of runtime that the HVAC equipment is in the on state for a second setpoint or schedule based on the actual runtime and the steady state gain; and
- adjust the first setpoint or schedule to the second setpoint or schedule based on the reduction of runtime.

20. The distributed computing system of claim 19, wherein the plurality of computing devices comprise:
a space controller configured to:
- determine the actual runtime that the HVAC equipment is in the on state based on the first setpoint or schedule; and
- adjust the first setpoint or schedule to the second setpoint or schedule based on the reduction of runtime; and a remote device communicably coupled to the space controller and configured to:
- estimate the steady state gain of the controlled variable of the HVAC system; and
- predict the reduction of runtime that the HVAC equipment is in the on state for the second setpoint or schedule based on the actual runtime and the steady state gain.

* * * * *